(12) United States Patent
Branson et al.

(10) Patent No.: US 9,086,777 B2
(45) Date of Patent: *Jul. 21, 2015

(54) SMART DISPLAY

(71) Applicant: International Business Machines Corporation, Armonk, NY (US)

(72) Inventors: Michael J. Branson, Rochester, MN (US); Gregory R. Hintermeister, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/772,293

(22) Filed: Feb. 20, 2013

(65) Prior Publication Data

US 2013/0179809 A1  Jul. 11, 2013

Related U.S. Application Data

(63) Continuation of application No. 13/232,371, filed on Sep. 14, 2011.

(51) Int. Cl.
  *G06F 3/048* (2013.01)
  *H04N 21/485* (2011.01)
  *G09G 5/00* (2006.01)

(52) U.S. Cl.
  CPC .......... *G06F 3/048* (2013.01); *G09G 5/003* (2013.01); *H04N 21/4858* (2013.01); *G06F 2203/04803* (2013.01); *G09G 2340/0464* (2013.01); *G09G 2340/14* (2013.01); *G09G 2360/18* (2013.01)

(58) Field of Classification Search
  CPC ................. H04N 5/445–5/45; H04N 21/4728; H04N 21/4858
  USPC .......................................... 715/765, 744, 866
  See application file for complete search history.

(56) References Cited

U.S. PATENT DOCUMENTS

| | | | |
|---|---|---|---|
| 5,812,128 A | 9/1998 | Sterling, IV | |
| 6,624,815 B1 * | 9/2003 | Morrish | 345/467 |
| 7,809,210 B2 | 10/2010 | Lou | |
| 7,890,877 B2 | 2/2011 | Ritchy et al. | |
| 2002/0015064 A1 | 2/2002 | Robotham et al. | |

(Continued)

OTHER PUBLICATIONS

User interface facades: towards fully adaptable user interfaces, by Wolfgang Stuerzlinger, Olivier Chapuis, and Nicolas Roussel, published in Rapport de Recherche 1408, LRI, Universite Paris-Sud, 2005.*

(Continued)

*Primary Examiner* — Tuyetlien Tran
*Assistant Examiner* — Patrick Ramsey
(74) *Attorney, Agent, or Firm* — Martin & Associates, LLC; Bret J. Petersen

(57) ABSTRACT

A smart display allows a user to build custom layouts of user interface blocks on the smart display independent of the software on the computer creating the user interface. A customization mechanism in the smart display allows a user to select portions of a user interface and move them to different positions on the display. The customization mechanism creates custom layout metadata that defines a screen offset for portions of a user interface moved by the user. The smart display monitors the incoming display data and re-assigns pixel rendering data to the new location in the moved user interface blocks as the data coming from the computer application changes.

5 Claims, 5 Drawing Sheets

(56) References Cited

U.S. PATENT DOCUMENTS

| | | |
|---|---|---|
| 2002/0099456 A1 | 7/2002 | McLean |
| 2003/0210267 A1 | 11/2003 | Kylberg et al. |
| 2007/0260986 A1 | 11/2007 | Cristofoli |
| 2008/0263462 A1 | 10/2008 | Mayer-Ullmann et al. |
| 2010/0207957 A1 | 8/2010 | Taneja et al. |
| 2010/0214481 A1 | 8/2010 | Karaoguz et al. |
| 2010/0229115 A1 | 9/2010 | Augustine et al. |
| 2011/0126158 A1 | 5/2011 | Fogarty et al. |
| 2012/0236013 A1 | 9/2012 | Wyatt et al. |

OTHER PUBLICATIONS

User interface facades: towards fully adaptable user interfaces, by Wolfgang Stuerzlinger, Olivier Chapuis, Dusty Phillips, and Nicolas Roussel; UIST '06 Proceedings of the 19th annual ACM symposium on User Interface software and technology, pp. 309-318, Oct. 2006.*

"Built-In Processor for Interface of Graphics Workstation", IBM Technical Disclosure Bulletin, 05-86, pp. 5524-5525, Mar. 9, 2005.

"NVIEW Desktop Management Software", http://www.nvidia.com/object/nview_display_us.html, 2011.

User interface facades: towards fully adaptable user interfaces, by Wolfgang Stuerzlinger, Olivier Chapuis, Dusty Phillips, and Nicolas Roussel; UIST '06 Proceedings of the 19th annual ACM symposium on User interface software and technology pp. 309-318, Oct. 2006.

R. Pike. 1983. Graphics in overlapping bitmap layers. ACM Trans. Graph. 2, 2 (Apr. 1983), 135-160. DOI= 10.1145/357318.357322 http://doi.acm.org/10.1145/357318.357322.

* cited by examiner

SMART DISPLAY

BACKGROUND

1. Technical Field

This disclosure generally relates to computer displays, and more specifically relates to a smart display that allows a user to reassign the layout of the displayed content independent of the computer hardware and software.

2. Background Art

A computer display or monitor is a well known and often an essential part of a computer system. The computer display or monitor provides a visual interface for a user to interact with what is going on inside the computer. While historically a computer display was typically a cathode ray tube (CRT), modern computer displays may also be one of many technologies including LCD (liquid crystal display), and LED (light emitting diode). A computer display may also incorporate one of a variety of touch screen technologies.

Regardless of the underlying technology, the display screen typically allows the user to interact with one or more processes or applications executing on a computer. The application controls how information is presented to the user in what is called a user interface on the display. With many applications, a user may be able to have some control over the user interface but any such control is within the limits of the user interface of the application.

BRIEF SUMMARY

A smart display allows a user to build custom layouts of user interface blocks on the smart display independent of the software on the computer creating the user interface. A customization mechanism in the computer display allows a user to select portions of a user interface and move them to different positions on the display. The customization mechanism creates custom layout metadata that defines a screen offset for portions of a user interface moved by the user. The smart display monitors the incoming display data and re-assigns data to the new location in the moved user interface blocks as the data coming from the computer application changes.

The foregoing and other features and advantages will be apparent from the following more particular description, as illustrated in the accompanying drawings.

BRIEF DESCRIPTION OF THE SEVERAL VIEWS OF THE DRAWING(S)

The disclosure will be described in conjunction with the appended drawings, where like designations denote like elements, and:

DETAILED DESCRIPTION

Described herein is an apparatus and method for a smart display that allows a user to build custom layouts of user interface blocks on the smart display independent of and without the knowledge of the software on the computer creating the user interface. A customization mechanism in the smart display allows a user to select portions of a user interface and move them to different positions on the display. The customization mechanism creates custom layout metadata that defines a screen offset for portions of a user interface moved by the user. The portions of the user interface moved by the user are typically rectangular blocks. The smart display monitors the incoming display data and re-assigns display data to the new location in the moved user interface blocks as the data coming from the computer application changes.

Figure 1:
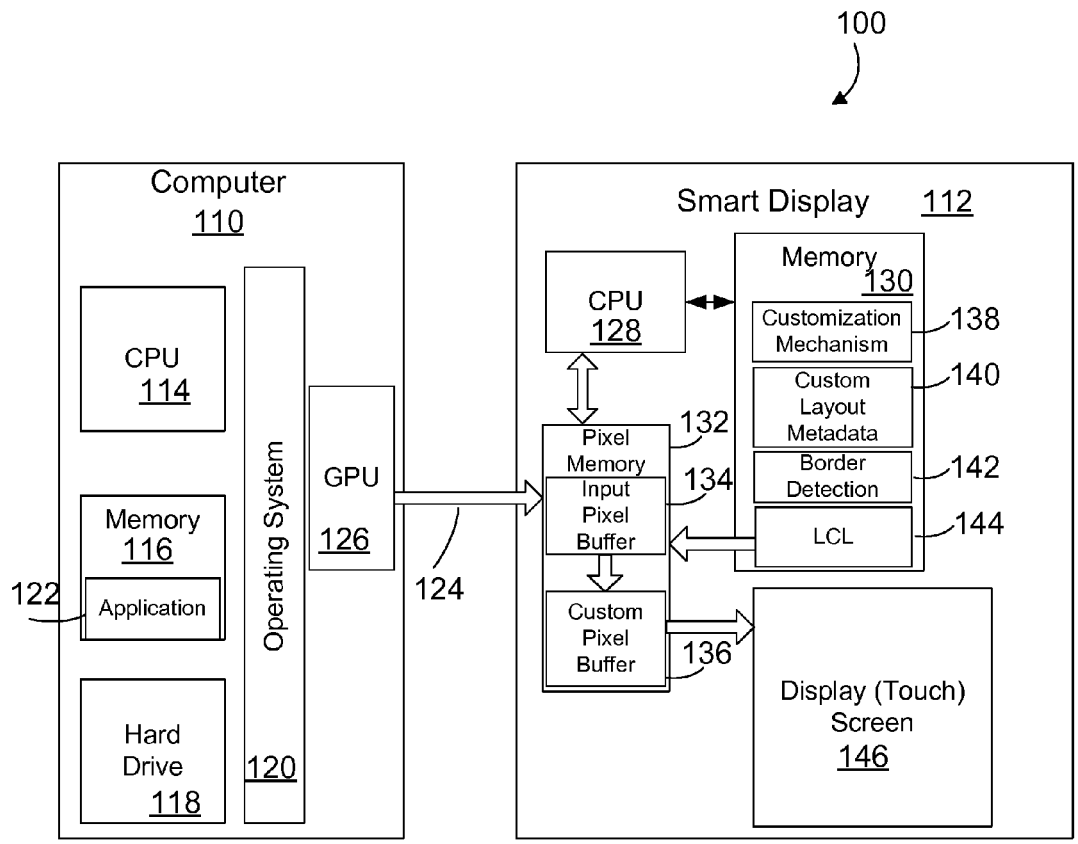
FIG. 1 is a block diagram of a computer system connected to a smart display with a customization mechanism using custom layout metadata.

FIG. 1 illustrates a block diagram of a computer display system 100 as described herein having a computer 110 and a smart display 112. The computer 110 represents a common multi-purpose personal computer. However, those skilled in the art will appreciate that the disclosure herein applies equally to any computer system or electronic device capable of being connected to a display or monitor. As shown in FIG. 1, computer 110 comprises one or more central processing units (CPU) 114, a main memory 116, and a mass storage device such as a hard drive 118. These system components are interconnected through the use of a system bus (not shown). The computer 110 includes an operating system 120. Those skilled in the art will appreciate that the spirit and scope of this disclosure is not limited to any one operating system. Any suitable operating system can be used. Operating system 120 is a sophisticated program that contains low-level code to manage the resources of computer 110. An application 122 executes on the CPU 14 from the memory 116 under control of the operating system 120. The application 122 in conjunction with the operating system 120 provides data to a graphics processing unit (GPU) 126. The GPU 126 then provides display data to the smart display 112. The GPU 126 provides a display data signal 124 to pass display data to the smart display 112 in a manner know in the prior art. As used herein, display data is data sent by the GPU to the display. Display data is typically pixel rendering data that includes pixel position and color.

Again referring to FIG. 1 the smart display 112 inputs the display data signal 124 with the display data from the GPU 126 in the computer 110. The smart display 112 includes a central processing unit (CPU) 128 connected to a memory 130. The smart display further includes a pixel memory 132 with an input pixel buffer 134 that holds a copy of the display data coming from the computer for analysis, and a custom pixel buffer 136 as described further below. The memory 130 includes a customization mechanism 138 that is a software entity that creates and maintains custom layout metadata 140 as described herein. The memory further includes a border detection mechanism 142 for detecting border changes in the video data to determine when the user interface block being re-assigned is no longer present in the display data. Display data received on the display data signal 124 from the GPU 126 is stored in the input pixel buffer 134. The display data in the input pixel buffer 134 is processed by customization mechanism 138 and the layout customization logic (LCL) 144 to fill the custom pixel buffer 136. The LCL provides logic to re-assign blocks of pixel data on the touch screen 146. The custom pixel buffer 136 then supplies display data to a display screen, in this case a touch screen 146. Each of these entities is described further below.

Figure 2:
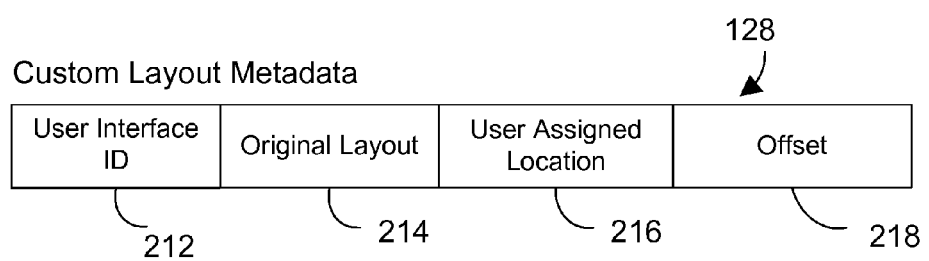
FIG. 2 is a block diagram that illustrates an example of custom layout metadata.

FIG. 2 is a block diagram that represents a highly simplified diagram of custom layout metadata 128. The custom layout metadata 128 includes a user interface ID 212 and may include other information regarding the original layout 214 of the user interface for the corresponding interface ID 212. The custom layout metadata 128 further includes reassignment data 216 and 218 that defines sections of the user interface that have been specified by the user to be reassigned to a new location on the customized display. In the illustrated embodiment, the user reassignment data includes a user assigned location for at least one pixel block 216 and an offset 218 for each pixel block or section that has been relocated in the custom layout. An example of this data is given in the example embodiments described below.

As mentioned above, the smart display 112 allows a user to build custom layouts of a user interface on the smart display independent of the software on the computer creating the user interface. Independent of the software as used herein means without the knowledge of or support of the computer operating system hardware and software. The smart display utilizes a customization mechanism 138 (software) in the computer display to allow a user to select portions or blocks of a user interface and move them to different positions on the touch screen 146 of the smart display. Since the portions of the user interface are typically rectangular blocks of pixels, the terms "user interface blocks", and pixel blocks are used herein, but it is understood that any shape could be selected and moved as described herein. A user interface block means a portion of the user interface that the user can select to reassign to a new location on the custom user interface. As used herein, a pixel block is the display data that is in the area or user interface block selected by the user to be moved.

In response to the user actions to create a custom layout, the custom layout mechanism creates a record in the custom layout metadata for each user interface with a custom layout. After the custom layout is created, the smart display will reassign pixel blocks of the user interface any time the same user interface and/or a user interface with the same basic pattern or layout is detected in the incoming display data signal 124. A record in the custom layout metadata may include a user interface ID 212, an original layout 214, a user assigned location 216, and an offset 218 as shown in FIG. 2. Again referring to FIG. 1, the customization mechanism 138 monitors input display data in the input pixel buffer 134 for user interface blocks that match records in the custom layout metadata. The border detection mechanism 142 monitors the input pixel buffer 134 to find a user interface block and the customization mechanism compares any user interface block found to records in the custom layout metadata 140. Where there is a match, the customization mechanism 138 supplies the offsets to the LCL 144 to reassign the pixel blocks identified by the user to modify the display data to build a custom layout using the custom pixel buffer 136. The custom pixel buffer then sends the display data with the custom user interface layout to the touch screen 146.

As discussed above, the pixel memory 132 has an input pixel buffer 134 and a custom pixel buffer 136. Preferably the input pixel buffer 134 is an array of memory to hold pixel information for the current screen of display data coming from the computer system 110. This allows the border detection mechanism to scan the input pixel buffer for user interface blocks that are defined by the user and stored in the custom layout metadata 140. In a first example, the custom pixel buffer 136 is also an array that holds display data for the current custom layout. The custom pixel buffer 136 holds a copy of the input pixel buffer 134 as modified by the LCL to create the custom user interface layout of pixel blocks per the custom layout metadata 140. Thus in this example, the contents of the input pixel buffer 134 are copied to the custom pixel buffer 136 and then modified in the custom pixel buffer 136 by the LCL to be displayed in the custom layout on the touch screen 146.

Alternatively, the custom pixel buffer could be simply a latch that holds a single pixel's worth of display data. In this case, the LCL would detect when a pixel of data coming from the input pixel buffer corresponds to a location in the custom layout metadata 140 and apply the corresponding offsets in the custom layout metadata before being sent to the touch screen 146. In this case the LCL will monitor each pixel as it is loaded into the custom pixel buffer and change the pixel data as needed before it is sent to the touch screen 146.

Figure 3:
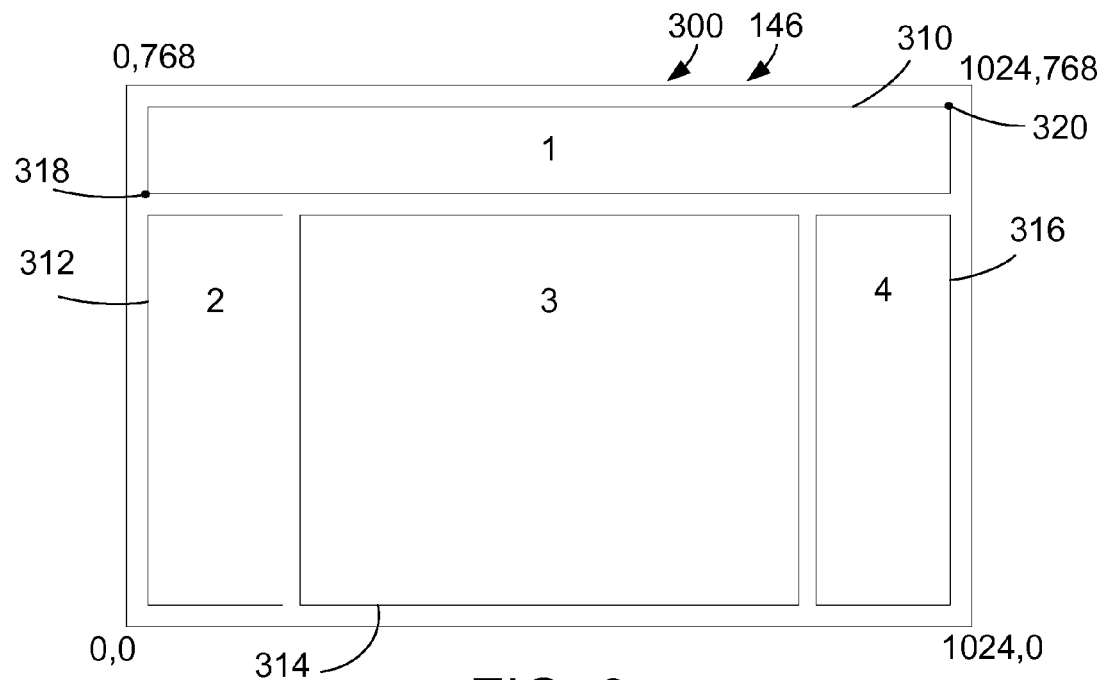
FIG. 3 is a block diagram that represents a user interface displayed on a touch screen of a smart display according to an example of an embodiment as described herein.
Figure 4:
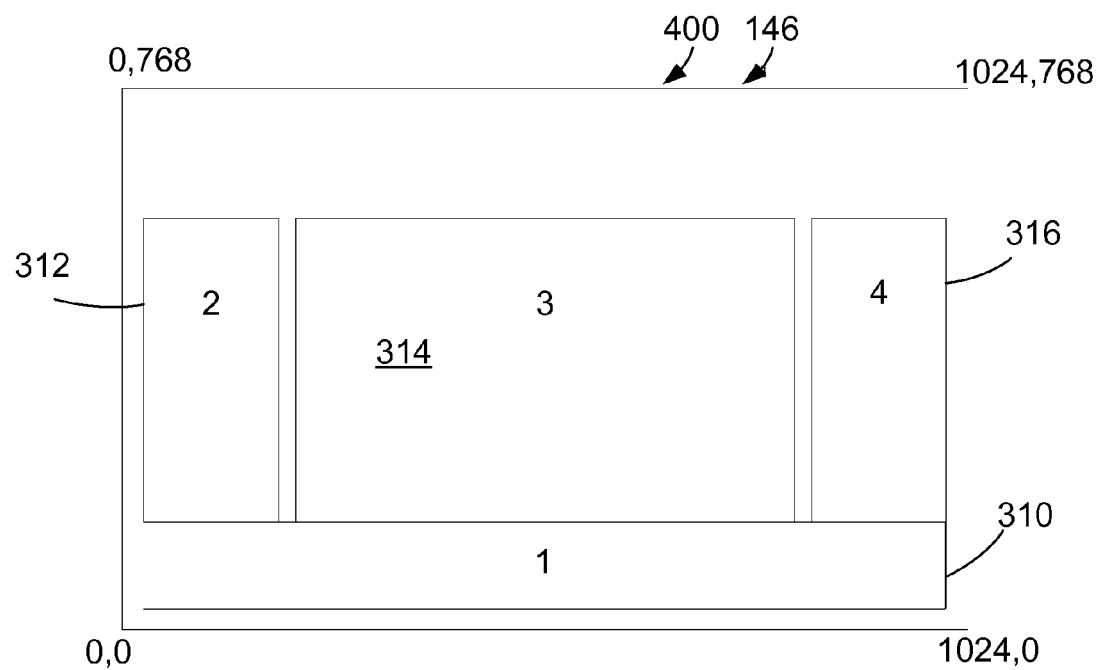
FIG. 4 is a block diagram that continues the example of FIG. 3.
Figure 5:
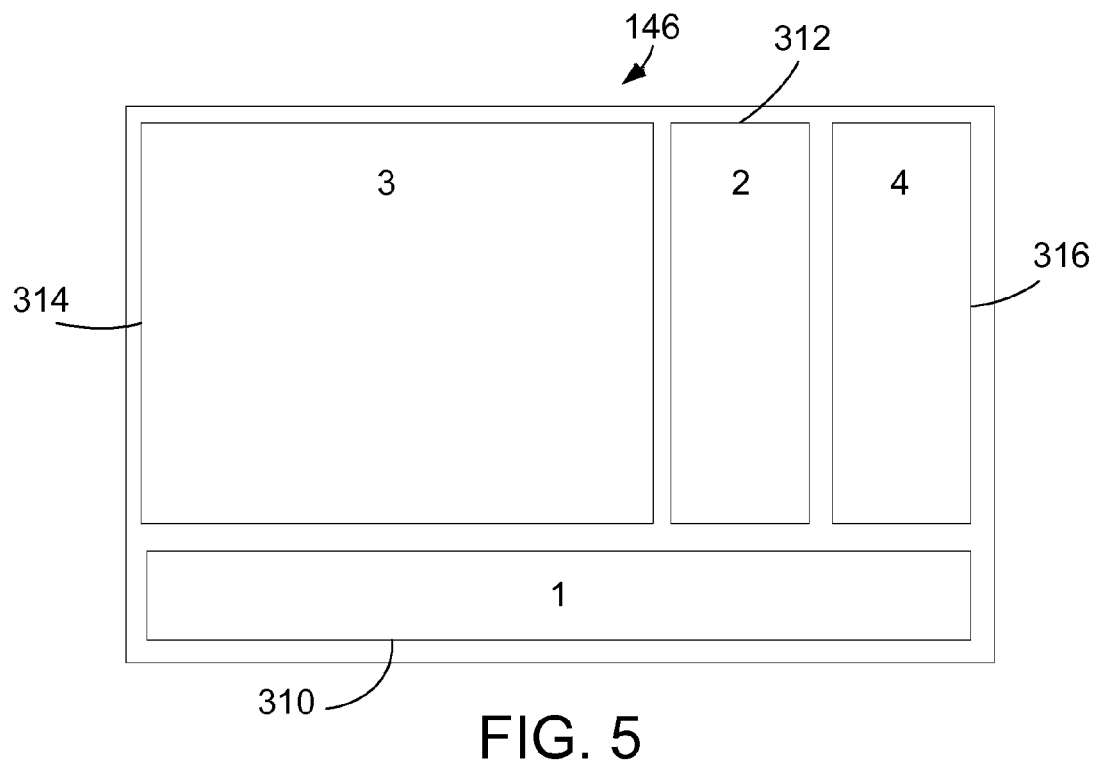
FIG. 5 is a block diagram that continues the example of FIG. 4.

FIGS. 3, 4 and 5 illustrate an example of selecting user interface blocks and moving corresponding pixel blocks of display data on a smart display. FIG. 3 represents a user interface 300 depicted on the touch screen 146 as originally created by an application 122 executing on the computer system 110 (FIG. 1). In this example, the touch screen 146 is 1024 by 768 pixels. For this example, we assume the pixels of the touch screen 146 are arranged in a Cartesian coordinate system in the first quadrant of the X,Y plane. The lower left hand corner of the touch screen represents coordinates 0,0 and the upper right corner of the touch screen represents coordinates 1024,768. Similarly, the upper left hand corner of the touch screen represents coordinates 0,768 and the lower right corner of the touch screen represents coordinates 1024, 0.

For the example illustrated in FIGS. 3-5, we assume that the application produces a user interface on the touch screen with four different user interface blocks—block 1 310, block 2 312, block 3 314 and block 4 316 as shown in FIG. 3. The user interface blocks represent portions of the user interface that are typically represented to the user as a rectangular shape. The user interface blocks 310, 312, 314, 316 have a border as shown by the outline of the blocks. Inside the borders, the user interface blocks typically have data or a selection of pixel buttons. For example, block 1 310 may be a control button area and block 3 314 may be a text entry area. Any pixel data, including UI control buttons within the user interface block will be moved with the selected user interface block and are not shown in the Figures. The user (not show) wishes to rearrange these blocks to create a custom layout using the smart display. In this example, the user identifies a pixel block for each of these user interface blocks to the smart display by "clicking" on opposing corners of the blocks. As used herein, the term "clicking" means using any input device for the user to gesture or indicate a screen location to the smart display. Any common input device such as a mouse or touch screen can be used to identify the pixel blocks. The user can click on any two opposing corners of a user interface block to identify a pixel block. For this example with a touch screen, the user touches the lower left corner 318 and the upper right corner 320 to create a pixel block 1 corresponding to user interface block 1 310. Likewise the user continues to identify each of the other three pixel blocks corresponding to user interface blocks 312, 314, 316. In this example, the user interface blocks and the corresponding pixel blocks use the same reference numbers for simplicity.

FIG. 4 continues the Example started with reference to FIG. 3. After the user has identified the pixel blocks as described above, the user is then able to click and "drag" the pixel blocks to the desired location on the custom user interface 400. In this example, the user has finished dragging block 1 310 to the bottom of the touch screen 146. The remaining pixel blocks 312, 314 and 316 are shown in their original position and are partly covered by block 1 310. The user can continue to drag the pixel blocks to desired locations. FIG. 5 illustrates the custom user interface 400 after the user has moved the remaining pixel blocks. As described above, in response to the user dragging pixel blocks the customization mechanism creates a record in the custom layout metadata. For the movement of user interface block 1, the customization mechanism creates a pixel offset for the display that is part of the customization metadata. If we assume the coordinates of the original location of the lower left hand corner as 20,628, then the custom layout metadata for block1 would be as follows.

|  | X | Y |
|---|---|---|
| Original Location | 20 | 628 |
| User Assigned Location | 20 | 20 |
| Offset | 0 | −600 |

Using the above offset in the metadata for block 1, the layout customization logic reassigns all pixels within the borders of block 1 (between the lower left hand corner 318 and the upper right hand corner 320) in the original layout to the area of the display shown by block 1 310 in custom layout of FIG. 5. In this example, all the pixels in block 1 are given an offset of −600 pixels. The custom layout metadata would include similar data for blocks 2, 3 and 4. As long as the same user interface blocks are in the input data to be displayed the customization mechanism applies the same custom layout metadata to the LCL. The border detection logic 142 (FIG. 1) can be used to determine when the display data changes such that the same user interface pattern with the custom layout is no longer being displayed. When this happens, the customization mechanism instructs the LCL to render the pixels of the display using the original layout from the computer (the unmodified or default display data).

Figure 6:
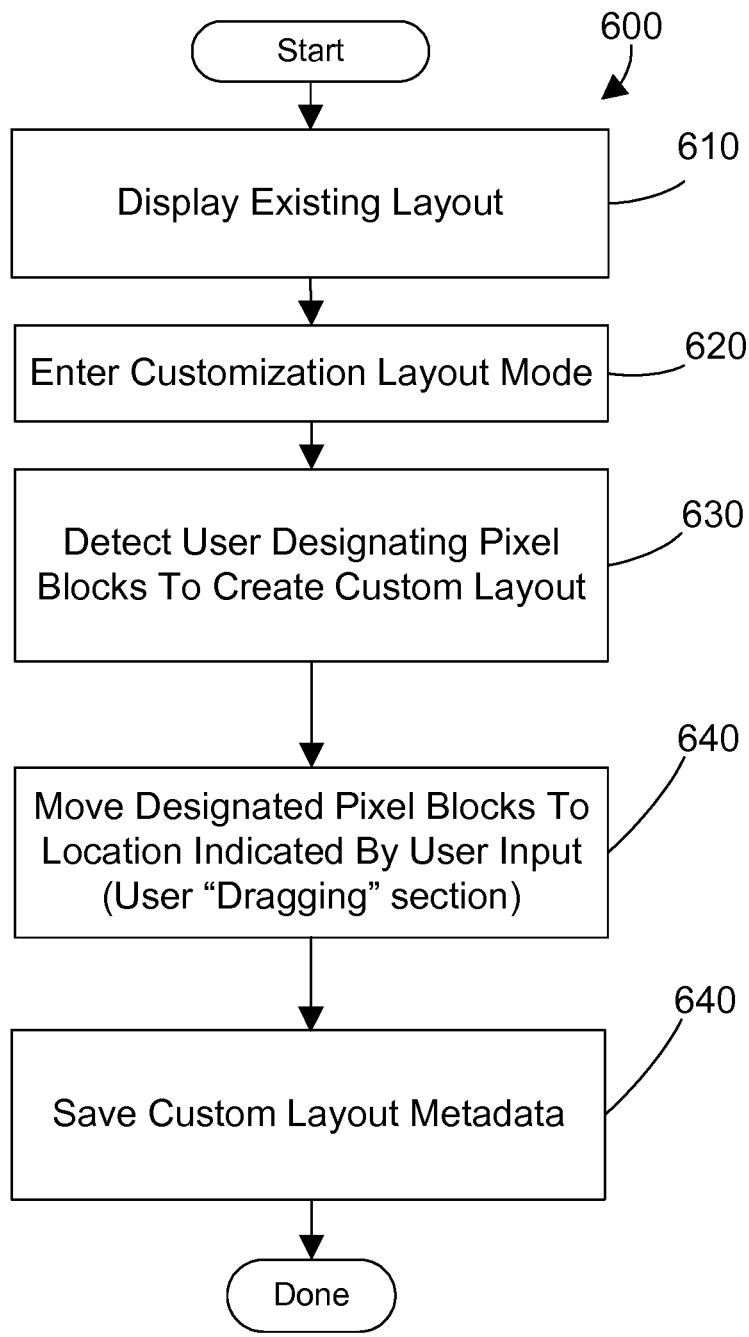
FIG. 6 is a method flow diagram for a customization mechanism that allows a user to build a custom layout of user interface blocks on a smart display.

FIG. 6 shows a method 600 for a customization mechanism that allows a user to build a custom layout of user interface blocks on a smart display. The steps in method 600 are preferably performed by the customization mechanism 136 (FIG. 1), but portions of the method may also be performed by other software associated with the smart display. First, display the existing or default user interface layout as received from the computer step (610). Next, enter into a customization mode, preferably through some action by the user on the smart display (step 620). Then, detect a user designating pixel blocks for the custom layout (step 630). Then move the designated pixel blocks to locations specified by the user, preferably by allowing the user to drag the pixel blocks to a new location on the display (step 640). Then save custom layout metadata for the custom layout created by the user (step 650). The method 600 is then done.

Figure 7:
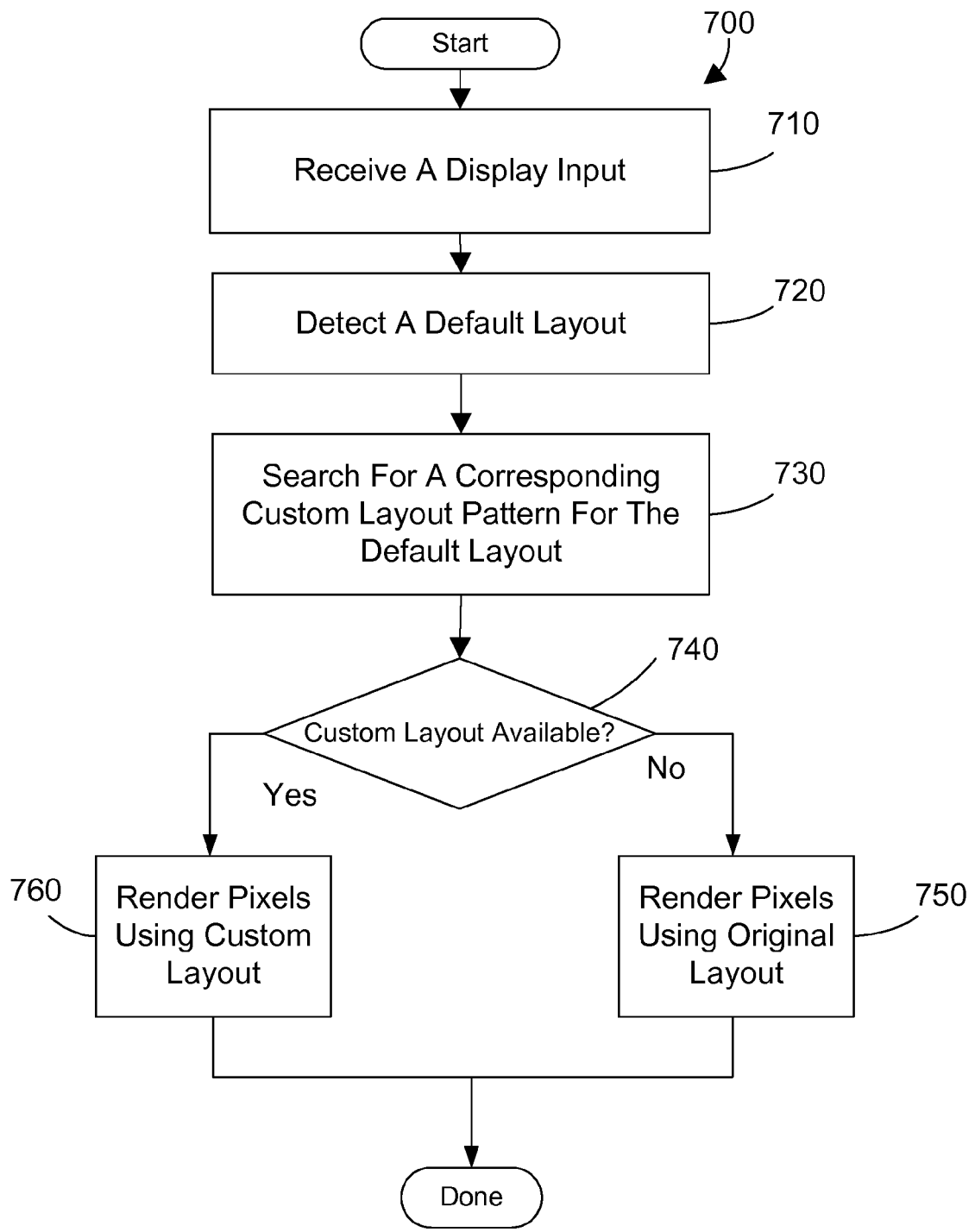
FIG. 7 is an example of a method flow diagram for displaying a custom layout on a smart display.

FIG. 7 shows a method 700 for displaying a custom layout on a smart display. Method 700 is preferably performed by the customization mechanism in conjunction with layout customization logic (LCL) 132 (FIG. 1), but portions of the method may also be performed by other software associated with the smart display. Method 700 is performed for incoming display data to detect and display custom layouts on the smart display. First, receive a display input from a computer (step 710). Next, detect a default pixel layout for a user interface in the incoming display data (step 720). Search for a corresponding custom layout pattern for the default layout (step 730). If a custom layout is not available (step 730=no), then render pixels of the display using the original default layout (step 750) and the method is done. If a custom layout is available (step 730=yes), then render pixels using the custom layout using the LCL and the custom layout metadata (step 760). The method is then done.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

One skilled in the art will appreciate that many variations are possible within the scope of the claims. While the examples herein are described in terms of time, these other types of thresholds are expressly intended to be included within the scope of the claims. Thus, while the disclosure is particularly shown and described above, it will be understood by those skilled in the art that these and other changes in form and details may be made therein without departing from the spirit and scope of the claims.

The invention claimed is:

1. A smart display comprising:
a display screen connected to a pixel memory in the smart display, wherein the pixel memory includes an input pixel buffer and a custom pixel buffer;
a processor and a memory;
a display data input that receives display data from a single video source, wherein the display data is pixel rendering data that includes pixel position and color with user interface blocks having an original layout, wherein the display data is received from a graphics processing unit of a computer connected to the display data input of the smart display and placed in the input pixel buffer;
a customization mechanism stored in the memory of the smart display and executing on the processor of the smart display that creates custom layout metadata in response to user input for a plurality of the user interface blocks in the display data received from the single video source of the computer connected to the smart display and placed in the input pixel buffer;
layout customization logic in the memory of the smart display that uses the custom layout metadata to reassign the received display data in the input pixel buffer to a new location in the custom pixel buffer to relocate the plurality of user interface blocks to a custom layout on the display screen; and
wherein the layout customization logic uses the pixel offset to reassign the at least one pixel block to the user assigned location on the display screen.

2. A smart display comprising:
a display screen connected to a pixel memory in the smart display, wherein the pixel memory includes an input pixel buffer and a custom pixel buffer wherein the custom pixel buffer is an array for holding custom display data for the display screen;
a processor and a memory;
a display data input that receives display data from a single video source, wherein the display data is pixel rendering data that includes pixel position and color with user interface blocks having an original layout, wherein the display data is received from a graphics processing unit of a computer connected to the display data input of the smart display and placed in the input pixel buffer;
a customization mechanism stored in the memory of the smart display and executing on the processor of the smart display that creates custom layout metadata in response to user input for a plurality of pixel blocks in the display data received from the single video source of the computer connected to the smart display and placed in the input pixel buffer, wherein the custom layout metadata comprises data of the original layout of the user interface blocks, a user assigned location for at least one pixel block, and a pixel offset for the user assigned location of the pixel block in the custom layout;
layout customization logic in the memory of the smart display that uses the custom layout metadata to reassign the received display data in the input pixel buffer to a new location in the custom pixel buffer to relocate the plurality of pixel blocks to a custom layout on the display screen, wherein the layout customization logic uses the pixel offset to reassign the at least one pixel block to the user assigned location on the display screen; and
a border detection mechanism to scan the input pixel buffer for changes in user interface blocks that are defined by the user and stored in the custom layout metadata to determine when the user interface block being re-assigned is no longer present in the display data.

3. The smart display of claim 2 wherein the display screen is a touch display.

4. The smart display of claim 2 and wherein the customization mechanism of the display screen allows a user to create custom layout metadata to relocate the pixel blocks to a custom layout by allowing the user to select user interface blocks and drag corresponding pixel blocks to a custom location on the display screen.

5. The smart display of claim 2 wherein the custom pixel buffer is a register for holding display data for a pixel of custom display data for the display screen.

* * * * *